(12) United States Patent
Marechal

(10) Patent No.: US 8,662,446 B2
(45) Date of Patent: Mar. 4, 2014

(54) FIXING SYSTEM FOR A SEAT, IN PARTICULAR AN AIRCRAFT SEAT

(75) Inventor: Xavier Marechal, Paris (FR)

(73) Assignee: ATTAX, Carrieres sur Seine (FR)

( * ) Notice: Subject to any disclaimer, the term of this patent is extended or adjusted under 35 U.S.C. 154(b) by 594 days.

(21) Appl. No.: 12/832,521

(22) Filed: Jul. 8, 2010

(65) Prior Publication Data

US 2011/0006160 A1 Jan. 13, 2011

(30) Foreign Application Priority Data

Jul. 9, 2009 (FR) ...................................... 09 54761

(51) Int. Cl.
*B60N 2/005* (2006.01)
*B64D 11/06* (2006.01)

(52) U.S. Cl.
USPC .................. 244/118.6; 248/503.1; 244/122 R

(58) Field of Classification Search
USPC ........................ 244/118.6, 131, 122 R, 118.5; 248/503.1
See application file for complete search history.

(56) References Cited

U.S. PATENT DOCUMENTS

| 3,486,204 A | 12/1969 | Hurtner et al. |
| 2002/0122709 A1* | 9/2002 | Diamante ........................ 410/77 |
| 2007/0065248 A1* | 3/2007 | Legeay .......................... 410/105 |

FOREIGN PATENT DOCUMENTS

| EP | 1 762 490 A1 | 3/2007 |
| FR | 2 893 996 A1 | 6/2007 |

* cited by examiner

*Primary Examiner* — Rob Swiatek
*Assistant Examiner* — Vicente Rodriguez
(74) *Attorney, Agent, or Firm* — Sughrue Mion, PLLC

(57) ABSTRACT

A fixing system for a seat, in particular an aircraft seat, comprising a base having attachment portions which are adapted to be set in an active position for attachment of the seat, by an operating lever which is movable to an active position for blocking the attachment portions, and which comprises a catch for locking the lever in the active position which is carried by the lever or the base and is adapted to cooperate with holding portions in order to lock the lever in the active position, the catch being movably mounted against the urging of resilient portions in order to allow the catch to pass over the holding portions and engage in the locking position, and to be disengaged under the action of rotary operating portions.

4 Claims, 3 Drawing Sheets

FIXING SYSTEM FOR A SEAT, IN PARTICULAR AN AIRCRAFT SEAT

Figure 1:
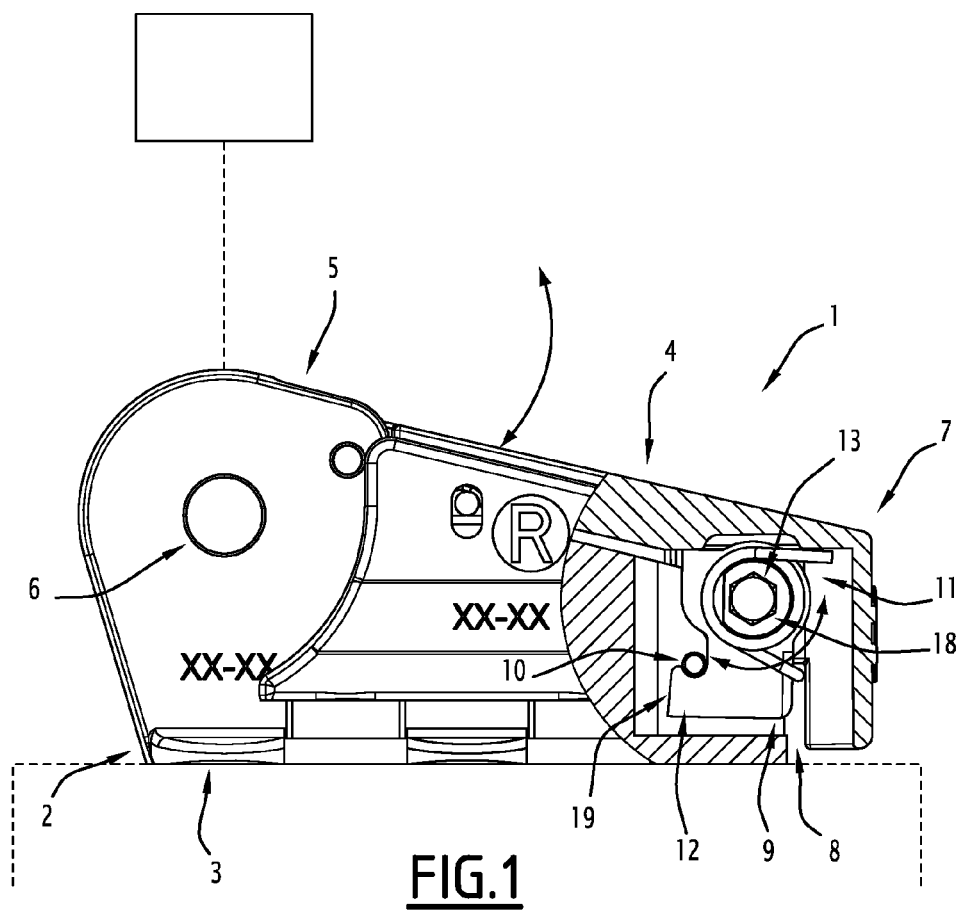

The present invention relates to a fixing system for a seat, in particular an aircraft seat.

More particularly, the invention relates to such a system comprising a base which is associated with the rest of the seat and is provided with means for attaching the seat to the rest of the aircraft, which means are movable between a retracted position for fitting/dismantling the seat and an active position for attachment of the seat, by way of an operating lever which is movable between a retracted fitting/dismantling position and an active position for blocking the attachment means in position and one end of which has means for articulation with the base and the other end of which has disengageable means for locking the lever in the active blocking position.

In the prior art, such systems are known in which the disengageable means for locking the lever in the active blocking position comprise a pin which is carried by the base and is associated with resilient urging means, the pin being suitable for engagement in a hole in the end of the lever in order to block the lever in the blocking position of the lever.

The hole passes through the end of the lever so that, in order to unlock the lever, it is appropriate to insert a tool into the hole in order to push back the pin and therefore disengage it from the hole in the lever, which allows the lever to be freed of the pin and therefore be released.

It will be understood, however, that this structure has a number of disadvantages, especially in terms of the reliability of the locking of the lever in the active position.

The object of the invention is, therefore, to solve those problems.

To that end, the invention relates to a fixing system for a seat, in particular an aircraft seat, of the type comprising a base which is associated with the rest of the seat and has means for attaching the seat to the rest of the aircraft, which means are movable between a retracted position for fitting/dismantling the seat and an active position for attachment of the seat, by way of an operating lever which is movable between a retracted fitting/dismantling position and an active position for blocking the attachment means in position and one end of which has means for articulation with the base and the other end of which has disengageable means for locking the lever in the active blocking position, characterized in that the locking means comprise means in the form of a catch which are carried by one of the members, the lever or the base, and are suitable for cooperation, in the active position, with holding means of the other member, the base or the lever, in order to lock the lever in the active catch position, the means in the form of a catch being movably mounted on the corresponding member against the urging of resilient means, in order to allow the means in the form of a catch to pass over the holding means and engage in the locking position therewith and to be freed from the holding means under the action of rotary operating means at the time of their disengagement therefrom, and in that the means in the form of a catch have at one end means for articulation with the corresponding member associated with the resilient urging means, comprising an articulation rod provided with an operating recess suitable for cooperation with an operating member in order to move the means in the form of a catch towards their position of disengagement of the holding means.

According to other features of the invention, taken separately or in combination:

the means in the form of a catch comprise a ramped portion for passing over the holding means at the time of their engagement in the locking position, the means in the form of a catch comprise a portion in the form of a hook, and the holding means comprise a holding rod, and the means in the form of a catch are carried by the corresponding end of the locking lever, and the holding means are associated with the base.

Figure 2:
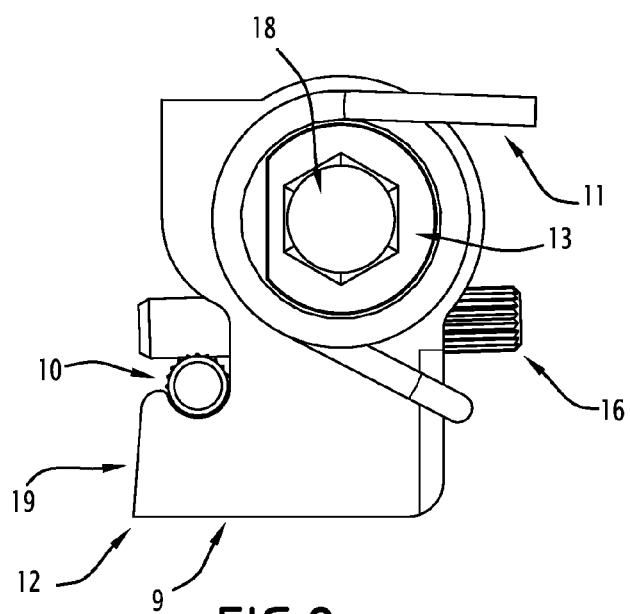
Figure 3:
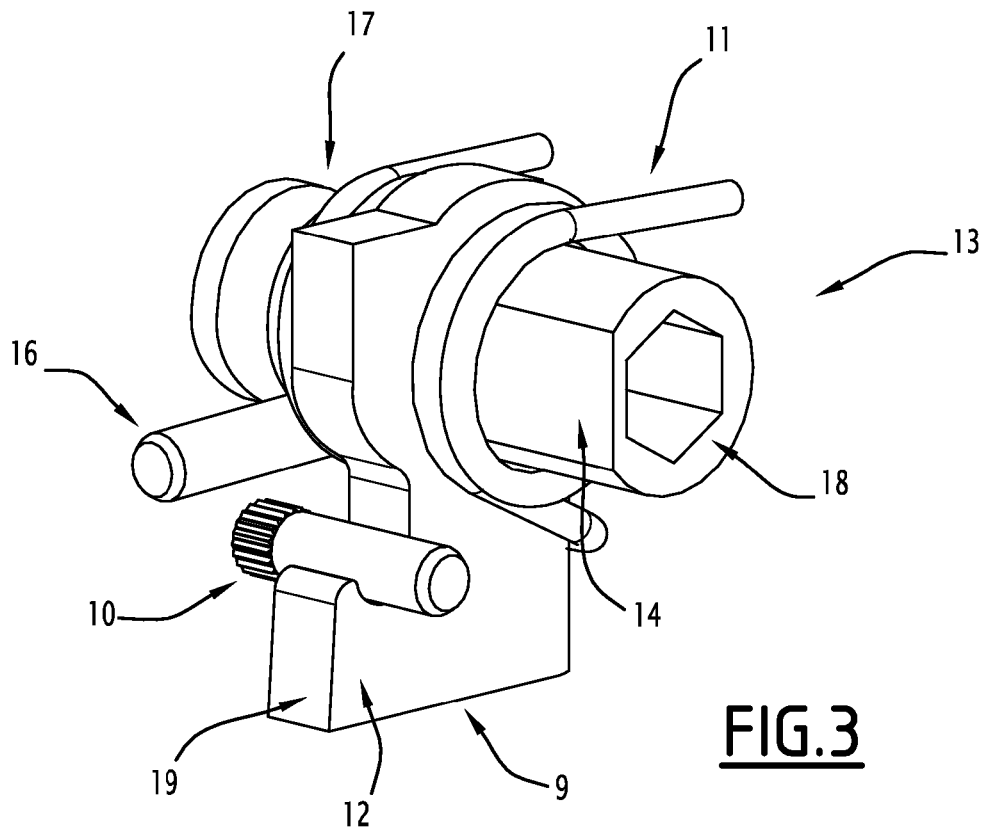
Figure 4:
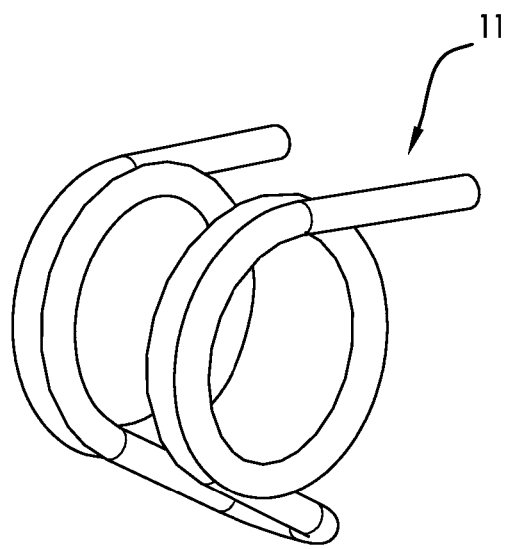
Figure 5:
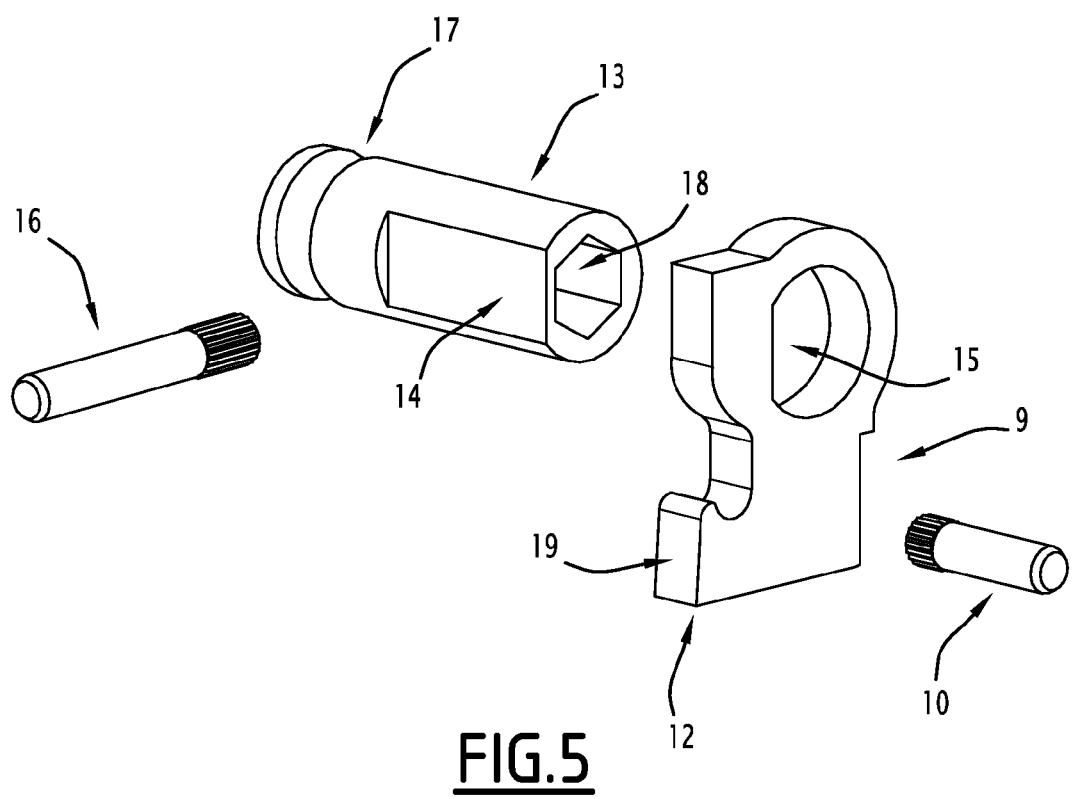

The invention will be better understood with the aid of the following description, which is given solely by way of example and with reference to the accompanying drawings, in which:

FIG. 1 shows a side view of a fixing system according to the invention with a part cut away showing the locking means in the active position of the lever, FIG. 2 shows a detailed side view of the locking means, FIG. 3 shows a perspective view of the locking means, FIG. 4 shows a perspective view of resilient urging means forming part of the locking means, and FIG. 5 shows an exploded view of the locking means.

The figures show a system for fixing a seat, in particular an aircraft seat, to the rest thereof, the system being designated by the general reference numeral 1 in the figures.

The system comprises a base, designated by the general reference numeral 2, which is associated with the rest of the seat and comprises means for attaching the seat to the rest of the aircraft, the attachment means being designated, for example, by the general reference numeral 3.

The attachment means are movable between a retracted position for fitting/dismantling the seat and an active position for attachment of the seat, by way of an operating lever, designated by the general reference numeral 4 in this figure, which is itself movable between a retracted fitting/dismantling position and an active position for blocking the attachment means in position, for example by an operator.

One end of the lever, that is to say, for example, its end designated by the general reference numeral 5, has means of articulation with the base 2, which means are constituted, for example, by an articulation rod designated by the general reference numeral 6 in FIG. 1, and the other end of the lever 4 has disengageable means for locking the lever in the active blocking position, this end of the lever being designated by the general reference numeral 7 and the locking means being designated by the general reference numeral 8.

As is shown in the figures, the locking means 8 comprise means in the form of a catch, designated by the general reference numeral 9 in the figures, which are carried by one of the members, the lever or the base, and are suitable for cooperation, in the active position, with holding means of the other member, that is to say the base or the lever.

In the figures, the holding means are formed by a holding rod and are designated by the general reference numeral 10.

In the example described, the means in the form of a catch 9 are carried by the corresponding end of the lever 4, while the holding means 10 are associated with the base 2.

It will be understood that an opposite arrangement of these elements can also be envisaged.

It will be understood that the means in the form of a catch 9 are suitable for cooperation with the holding means 10 in order to lock the lever 4 in the active blocking position.

As is shown, the means in the form of a catch 9 are movably mounted on the corresponding member against the urging of resilient means designated by the general reference numeral 11 in the figures, which allows the means in the form of a catch 9 to pass over the holding means 10 by deflecting by pivoting and to be engaged in the locking position with the holding means 10 when the lever is moved towards its active position.

The resilient means also allow the means in the form of a catch 9 to be freed from the holding means 10 under the action of rotary operating means, at the time of their disengagement therefrom, actuated, for example, by the operator.

As is shown in the figures, the means in the form of a catch 9 comprise at one end a portion in the form of a hook, designated by the general reference numeral 12 in the figures, which is suitable for cooperation with the holding means 10, which comprise, for example, the holding rod.

The means in the form of a catch 9 are also associated with means for articulation with the corresponding member, that is to say, in the example described, with the lever 4, which means are constituted, for example, by an articulation rod, designated by the general reference numeral 13 in the figures, which is suitable for engagement in a hole in the means in the form of a catch 9.

As is shown in the various figures, the articulation rod 13 comprises, for example, a flat portion, designated by the general reference numeral 14, which is suitable for cooperation with a complementary flat portion 15 of the hole in order to produce a rotary connection of the two elements.

The rod 13 is rotatably mounted in holes in the lever and is held in position in the holes by way of a blocking rod, designated by the general reference numeral 16, which is suitable for cooperation with a groove in the articulation rod 13, the groove being designated by the general reference numeral 17 in the figures.

As is shown in the figures, the articulation rod 13, and more particularly one of its ends, for example, is provided with an operating recess, designated by the general reference numeral 18 in the figures, which is suitable for cooperation with a rotary operating member in order to move the means in the form of a catch 9 towards their position of disengagement of the holding means, against the urging of the resilient means 11.

In the example shown, the operating recess 18 is constituted by a hexagonal socket at the end of the articulation rod 13, but it naturally goes without saying that other embodiments can be envisaged.

In addition, and as is also shown in the figures, it will be noted that the means in the form of a catch 9 comprise a ramped portion, designated by the general reference numeral 19 in the figures, which facilitates their passing over the holding means 10 at the time of their engagement in the locking position.

It will be understood that, at the time of the movement of the lever 4 towards its active locking position, the portion in the form of a ramp 19 first abuts the holding means 10.

As the lever continues to move towards its active position, the ramped portion passes over the holding means, the means in the form of a catch 9 deflecting while at the same time pivoting slightly against the urging of the resilient means 11 during this passage.

Once the portion in the form of a hook 12 of the means forming a catch has passed over the holding means 10, the resilient urging means 11 return them to the locking position as shown in the figures.

This structure allows the lever 4 to be locked reliably in the blocking position.

When it is appropriate to unlock the lever, it is sufficient to insert a corresponding operating member into the recess 18 at the end of the articulation rod 13 and pivot the rod, and therefore the means in the form of a catch, slightly in order to free them and disengage them from the holding means 10 in order to release the lever 4 and therefore allow it to move towards its retracted locking position.

Of course, it goes without saying that other embodiments can be envisaged.

It will be noted that different structures of the means for attaching the base to the rest of the aircraft can be envisaged, whether they be means having a rail, a pin, etc.

The invention claimed is:

1. Fixing system for a seat comprising:
    a base which is associated with the rest of the seat and which has attachment means for attaching the seat to the rest of the aircraft, said attachment means being adapted to be set in an active position for attachment of the seat, by way of
    an operating lever which is movable between a retracted fitting and dismantling position for fitting and dismantling said seat and an active blocking position for blocking the attachment means in said active position,
        one end of which has articulation means for articulation with the base, and
        the other end of which has disengageable locking means) for locking the operating lever in said active blocking position,
    wherein the locking means comprise means in the form of a catch which are carried by a first element of the lever, and are suitable for cooperation, in said active position, with holding means for holding a second element, said second element being different from said first element, in order to lock the operating lever in said active blocking position, said means in the form of a catch being movably mounted on said first element against the urging of resilient means in order to allow the means in the form of a catch to pass over the holding means and engage in said locking position therewith and to be freed from the holding means under the action of rotary operating means so as to disengage said means in the form of a catch therefrom, and
    wherein the means in the form of a catch have at one end articulation means for articulation of the means in the form of a catch relative to said first element, said articulation means being associated with the resilient urging means and comprising an articulation rod provided with an operating recess suitable for cooperation with an operating member in order to disengage the means in the form of a catch from the holding means so as to allow the operating lever to move towards said retracted fitting and dismantling position.

2. Fixing system for a seat according to claim 1, characterized in that the means in the form of a catch comprise a ramped portion for passing over the holding means so as to engage said means in the form of a catch in said locking position.

3. Fixing system for a seat according to claim 1, characterized in that the means in the form of a catch comprise a portion in the form of a hook, and in that the holding means comprise a holding rod.

4. Fixing system for a seat according to claim 1, characterized in that the means in the form of a catch are carried by the corresponding end of the operating lever, and in that the holding means are associated with the base.

* * * * *